United States Patent
Dib et al.

(10) Patent No.: US 11,005,331 B2
(45) Date of Patent: May 11, 2021

(54) CLOSED ROTATING ELECTRICAL MACHINE COMPRISING AN INTERNAL AIR COOLING SYSTEM OF THE MAGNETS IN THE ROTOR

(71) Applicants: IFP Energies nouvelles, Rueil-Malmaison (FR); MAVEL S.r.l., Pont Saint Martin (IT)

(72) Inventors: Wissam Dib, Suresnes (FR); Luca Favre, Valpelline (IT); Davide Bettoni, Septimo Vittone to Italy (IT)

(73) Assignee: MAVEL S.R.L., Pont Saint Martin (IT)

( * ) Notice: Subject to any disclaimer, the term of this patent is extended or adjusted under 35 U.S.C. 154(b) by 88 days.

(21) Appl. No.: 16/479,503

(22) PCT Filed: Jan. 17, 2018

(86) PCT No.: PCT/EP2018/051120
§ 371 (c)(1),
(2) Date: Jul. 19, 2019

(87) PCT Pub. No.: WO2018/137984
PCT Pub. Date: Aug. 2, 2018

(65) Prior Publication Data
US 2019/0334409 A1 Oct. 31, 2019

(30) Foreign Application Priority Data
Jan. 25, 2017 (FR) .................................. 17/50.583

(51) Int. Cl.
*H02K 9/06* (2006.01)
*H02K 5/18* (2006.01)
(Continued)

(52) U.S. Cl.
CPC ............... *H02K 5/18* (2013.01); *H02K 1/246* (2013.01); *H02K 5/20* (2013.01); *H02K 7/083* (2013.01);
(Continued)

(58) Field of Classification Search
CPC ............ H02K 5/18; H02K 1/246; H02K 5/20; H02K 7/083; H02K 9/06; H02K 9/18;
(Continued)

(56) References Cited

U.S. PATENT DOCUMENTS 2,043,655 A 6/1936 Ehrmann
2,185,740 A * 1/1940 Smith ...................... H02K 9/18
310/57

(Continued)

FOREIGN PATENT DOCUMENTS

DE 616902 C 7/1935
EP 2993762 A1 3/2016
(Continued)

OTHER PUBLICATIONS

International Search Report for PCT/EP2018/051120, dated Apr. 24, 2018; English translation submitted herewith (7 pgs.).

*Primary Examiner* — Thomas Truong
(74) *Attorney, Agent, or Firm* — Fitch, Even, Tabin & Flannery LLP

(57) ABSTRACT

The invention relates to an enclosed rotary electrical machine including a cooling system comprising two internal fans (181, 182) fixedly mounted on shaft (160) at both ends of rotor (150). The rotor and stator (190) are contained in an enclosure sealed by two flanges. The fans allow dual air circulation in flux barriers surrounding the rotor magnets and formed by axial recesses running throughout the rotor, and also air circulation in the space created between the internal fans and the inner faces of the flanges comprising (Continued)

fins (113, 123) which orient the air flows created by the fans to capture the heat thereof. External cooling allows the enclosure and the flanges to be cooled, by air or liquid cooling.

18 Claims, 9 Drawing Sheets

(51) Int. Cl.
*H02K 1/24* (2006.01)
*H02K 5/20* (2006.01)
*H02K 7/08* (2006.01)
*H02K 9/18* (2006.01)
*H02K 9/19* (2006.01)

(52) U.S. Cl.
CPC ............. *H02K 9/06* (2013.01); *H02K 9/18* (2013.01); *H02K 9/19* (2013.01)

(58) Field of Classification Search
CPC .. H02K 9/19; H02K 9/08; H02K 1/32; H02K 9/14; H02K 1/276
USPC .............................. 310/54, 62, 63
See application file for complete search history.

(56) References Cited

U.S. PATENT DOCUMENTS

| | | | |
|---|---|---|---|
| 10,298,086 | B2 | 5/2019 | Pera et al. |
| 2008/0278011 | A1* | 11/2008 | Elgas ....................... H02K 5/20 310/52 |
| 2009/0273246 | A1 | 11/2009 | Weiss |
| 2010/0013330 | A1* | 1/2010 | Rodriguez Rodriguez ................ H02K 5/20 310/54 |
| 2011/0316366 | A1* | 12/2011 | Abbasian ............... H02K 19/32 310/46 |
| 2012/0074801 | A1 | 3/2012 | Brown et al. |
| 2013/0104385 | A1* | 5/2013 | Dokonal ................ B21D 53/26 29/598 |

FOREIGN PATENT DOCUMENTS

| | | |
|---|---|---|
| FR | 736474 A | 11/1932 |
| FR | 1424667 A | 1/1966 |
| JP | H09-233767 A | 9/1997 |
| WO | 2015/136422 A1 | 9/2015 |
| WO | 2016/188764 A1 | 12/2016 |

* cited by examiner

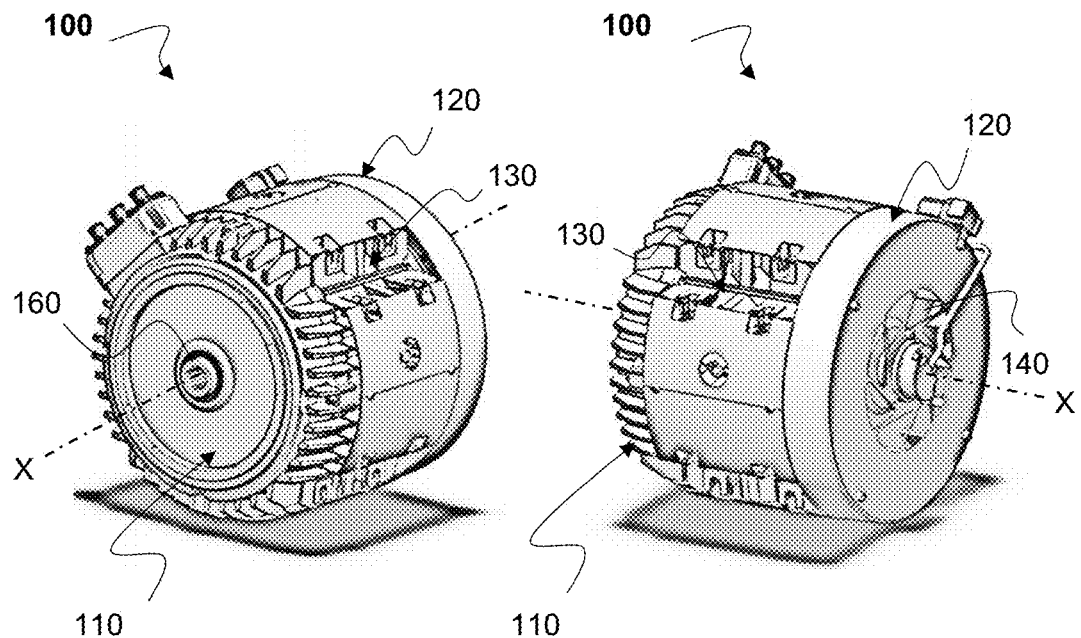
FIG. 1A  FIG. 1B
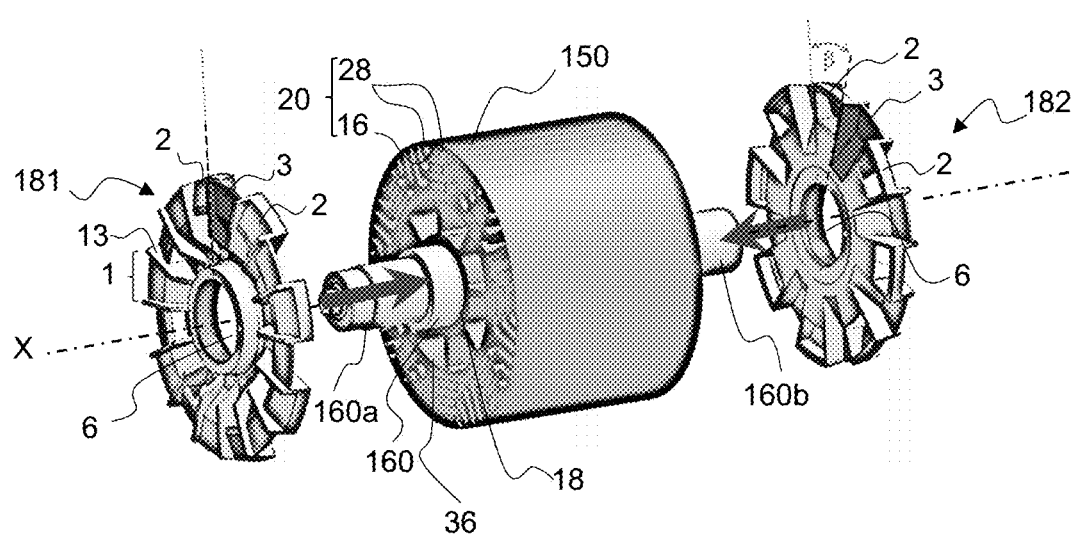
FIG. 2

CLOSED ROTATING ELECTRICAL MACHINE COMPRISING AN INTERNAL AIR COOLING SYSTEM OF THE MAGNETS IN THE ROTOR

CROSS REFERENCE TO RELATED APPLICATIONS

Reference is made to PCT/EP2018/051120 filed Jan. 17, 2018, and French Application No. 17/50.583 filed Jan. 25, 2017, which are incorporated herein by reference in their entirety.

BACKGROUND OF THE INVENTION

Field of the Invention

The present invention relates to the field of rotary electrical machines, in particular to rotary electrical machine cooling and more specifically relates to cooling of an enclosed variable synchronous reluctance rotary electrical machine.

Description of the Prior Art

A rotary electrical machine conventionally comprises a stationary part, the stator, and a rotatably mobile part, the rotor, coaxially arranged relative to each other. The rotor is generally housed within the stator that carries electrical windings which generate a magnetic field to drive the rotor in rotation. The rotor typically is a body made up of bundles of laminations which are mounted on a rotating shaft. These laminations comprise housings for permanent magnets or windings forming magnetic poles on the periphery of the rotor. The magnets can appear at the surface of the rotor or they can be entirely integrated within the rotor. In the case of variable synchronous reluctance rotary electrical machines, the rotor generally comprises permanent magnets arranged adjacent flux barriers carried by the rotor with the flux barriers being typically void spaces. They are also referred to as permanent magnet-assisted synchronous reluctance machines.

Electrical machines overheat due to electromagnetic (Joule effect losses and iron losses) and mechanical losses. This overheating impairs the proper operation thereof and leads to performance degradation. For example, if the magnets are not cooled, the magnetic flux is less intense, which leads to torque loss and therefore to electrical machine performance degradation. Irreversible demagnetization of the magnets may occur. The winding is also sensitive to temperature increase with the higher the winding temperature, the lower the electrical conductivity of the copper and the life of the winding. As the resistance of the copper increases, an efficiency loss also occurs. The various electromagnetic components of a rotary electrical machine, as well as some insulating materials used in the electrical machine parts, are thus sensitive to the overheating generated during operation, and cooling thereof is essential in order to dissipate the heat produced for maintaining good efficiency of the machine, to provide performance repeatability, to extend the lifetime and to limit the maintenance thereof.

The search for efficient cooling is therefore a major concern for rotary electrical machine manufacturers and integrators.

There are various types of cooling systems, often suited to the power of the machine, among which are air cooling systems which generally are less efficient and aggressive facing the inside of the machine such as liquid cooling systems using water for example which notably are utilized as soon as significant losses occur, as it is the case with electrical traction motors, or oil cooling systems. Other cooling systems using liquid nitrogen or helium can be utilized for electrical machines in electrical power plants.

Although air cooling of the machine, more precisely of the enclosure (or casing) of the machine containing the rotor and the stator, is an economically interesting option by comparison with the other cooling systems, it is generally less effective and it is therefore often limited to cooling of low-power electrical machines. This is for example the case in traction applications where air cooling is typically used for electrical motors with power of less than 20 kW. Beyond, low power applications a liquid cooling system is often implemented.

Furthermore, air cooling can require air circulation between the outside and the inside of the electrical machine, which adds to the limitation of the scope thereof, reserved in this case for "open", that is non-sealed, electrical machines.

In air cooling systems for "enclosed" (sealed) electrical machines, which are limited to cooling the outer part of the machine casing, forced air convection is achieved by a fan integral with the shaft, and the heat generated at the rotor is directed to the air of the air gap and the stator with this heat being discharged through the casing. However, such systems do not adequately discharge the heat generated within the machine, notably at the rotor, which makes it difficult to use, especially for cooling electrical machines with very high rotation speeds. The efficiency of such air cooling systems for enclosed machines is thus limited, and the use thereof is again limited to low-power machines.

SUMMARY OF THE INVENTION

The present invention is directed to overcoming the drawbacks of the aforementioned prior art and to provide an efficient cooling system for enclosed rotary electrical machines, in order to guarantee the desired performances and efficiency of the electrical machine.

In particular, the present invention provides efficient cooling of the shaft, of the rotor and more specifically of the permanent magnets arranged close to flux barriers carried by the rotor, and of the winding heads of a rotary electrical machine that can have a high IP protection code according to the EN 60,529 standard, typically an IP67 protection code.

The invention further provides a cooling system which consumes (passive system) or only a reduced amount of electrical power, and which limits the mechanical losses related to the operation of the system.

Thus, in order to achieve at least one of the aforementioned objectives, among others, the present invention provides an enclosed rotary electrical machine comprising:
  a stator disposed in an enclosure and comprising windings;
  a rotor comprising a body fastened to a shaft rotating about a central axis (X), the rotor being mounted to rotate in the stator and comprising first recesses which house magnetic flux generators and second recesses which form magnetic flux barriers with the first and second recesses being elongated and running throughout the body of the rotor along axis (X);
  a pair of bearings supporting each one end of the rotating shaft;

a front flange and a rear flange respectively disposed at two opposite front and rear ends of the enclosure, the front and rear flanges comprising each seals which tightly seal the enclosure, an inner face, an outer face, and a central housing receiving one of the bearings, and the inner face of the flanges comprising fins disposed on a peripheral part of the central housing; and a cooling system comprising a pair of internal fans, each internal fan being fixedly mounted on the rotating shaft between the rotor body and one of the bearings to create, upon rotation of the shaft, a first two-way air flow in the second recesses of the rotor and a second air flow between each internal fan and the inner face of the front or rear flange.

Preferably, each internal fan comprises an inner face, an outer face, a central opening for passage of the rotating shaft and alternating open radial sectors and closed radial sectors which divide the surface of the internal fan and which are separated by radial walls extending orthogonal to axis (X) which form protruding blades on the outer face of the internal fan.

Advantageously, the internal fans have a circular shape, with an inner face comprising a plane part resting on the rotor body and which is orthogonal to central axis (X), the orthogonal plane part being extended by an inclined plane part at each closed radial sector and by an opening at each open radial sector.

Preferably, the rotor comprises n magnetic poles formed by the flux generators and the flux barriers, each magnetic pole being covered by two closed and open radial sectors adjacent to an internal fan, and the two internal fans being mounted with an angular offset on the rotating shaft which matches an open radial sector of one internal fan to a closed radial sector of the other internal fan along a single axis substantially parallel to central axis (X).

Preferably, the total number of open and closed radial sectors of an internal fan is 2n, and the two internal fans are mounted to be offset on the shaft by an angle β equal to 360/(2n), with n being an even integer ranging between 2 and 12, preferably equal to 4 or 8.

Advantageously, the internal fans and the fins of the inner face of the flanges are capable of directing the air radially towards the winding heads of the stator, then returning the air flow from the winding heads to the center of the flanges, first along a direction parallel to axis (X) at the winding heads, then radially towards the rotating shaft, to form the second air flow created between each internal fan and the inner face of the front or rear flange.

The fins of the inner face of the flanges can be plane and have a general trapezoidal shape comprising bases orthogonal to central axis (X) and a side opposite to the housing which is concave.

Advantageously, the machine further comprises external cooling for cooling the enclosure and the front and rear flanges.

According to an embodiment, the external cooling comprises an external fan disposed opposite the outer face of the rear flange and fixedly mounted on the rotating shaft to direct outside air along the enclosure in the direction of the front flange.

According to this embodiment, the enclosure can have an outer surface comprising a set of elongate cooling fins substantially along an axis parallel to axis (X) of the rotating shaft, and the rear flange can comprise a central part forming a crown connected to a cylindrical peripheral part and at least one opening provided between the central part and the peripheral part of the rear flange for directing the outside air sent by the external fan into passages formed by the set of cooling fins of the outer surface of the enclosure.

The external fan preferably comprises an wheel which directs outside air and is fastened to the rotating shaft and a protective plate comprising orifices permitting entry of the outside air to enter, the plate which is attached to the peripheral part of the rear flange.

According to another embodiment, the external cooling comprises a coolant circuit including a coolant inlet, a coolant outlet and a network of lines in contact with the enclosure, wherein the coolant circulates in order to cool the enclosure and the front and rear flanges, and wherein the network of lines is preferably a coil integrated in the enclosure.

Preferably, the coolant comprises water.

The electrical machine according to the invention is preferably a synchronous reluctance electrical machine.

BRIEF DESCRIPTION OF THE DRAWINGS

Other features and advantages of the invention will be clear from reading the description hereafter of particular embodiments of the invention, given by way of non limitative example, with reference to the accompanying figures wherein:

FIGS. 1A and 1B are perspective views respectively of the front part and of the rear part of the electrical machine according to a first embodiment of the invention wherein cooling of the machine is carried out entirely by air cooling;

FIG. 2 is a perspective view of the rotating part of the electrical machine according to the invention on which two internal fans are mounted;

FIG. 17C is identical to the view of FIG. 17B additionally showing the liquid circulation in the enclosure.

In the figures, like reference numerals designate identical or similar elements.

DETAILED DESCRIPTION OF THE INVENTION

Figure 3:
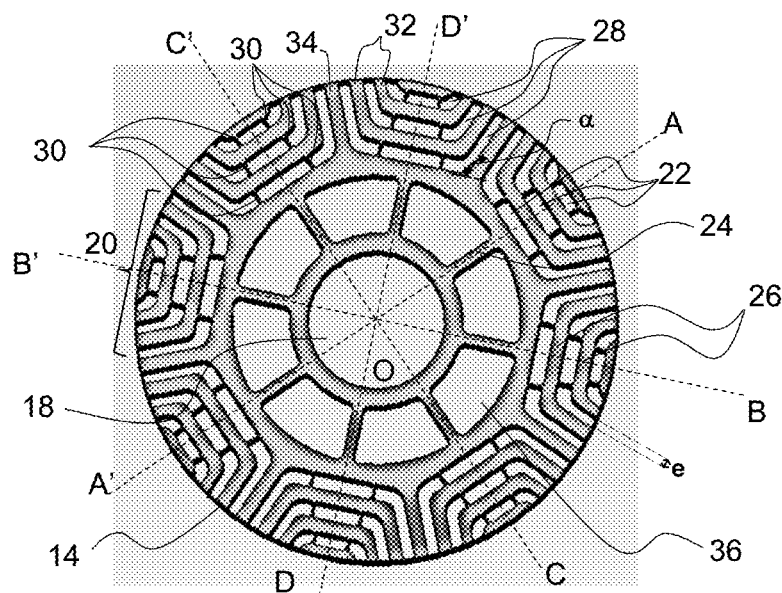
FIG. 3 is a radial cross-sectional view of the rotor of the electrical machine according to the invention.

The invention is an enclosed rotary electrical machine including a cooling system that comprises two internal fans fixedly mounted on the rotor shaft, at both ends of the rotor, allowing dual air circulation through the rotor via the flux barriers surrounding the permanent magnets included in the rotor. Each internal fan faces the inner face of a flange comprising fins which direct the inside air flow created by the internal fans and to capture the flow of heated air.

An enclosed electrical machine is understood to be an electrical machine whose rotor and stator are enclosed in a sealed enclosure that can also be referred to as a casing.

According to the invention, the enclosure containing the rotor and the stator of the electrical machine is sealed by two flanges.

The cooling system can also comprise external cooling for cooling the enclosure and the flanges, which can be air or liquid cooling.

In the description, the inside air is understood to be the air contained in the enclosed electrical machine, more precisely the air enclosed in the sealed enclosure of the machine, and the outside air is understood to be the air outside the enclosed rotary electrical machine.

FIGS. 1A and 1B show an enclosed electrical machine according to a first embodiment of the invention, which can be used as an electrical traction motor in an electric or hybrid vehicle.

For example, a motor as shown in FIGS. 1A and 1B is a variable synchronous reluctance motor, also referred to as synchro-reluctant motor, with a constant power of 30 kW, a transient (peak) power of 52 kW, which can operate with a DC bus voltage of 350 V. It is a permanent magnet-assisted synchro-reluctant machine.

Although it advantageously applies to variable synchronous reluctance electrical machines, the present invention is not limited to this electrical machine topology, and it concerns more extensively any type of electrical machine comprising a rotor with flux barriers consisting of recesses running throughout the rotor. The electrical machines according to the invention have a transient power (peak: transient for 30 seconds) ranging between 20 kW and 400 kW for example. More specifically, the electrical machines according to the first embodiment can have a power ranging between 20 kW and 75 kW, and the electrical machines according to the second embodiment described below can have a power ranging between 75 kW and 400 kW.

Electrical motor 100 comprises an enclosure 130 sealed by a front flange 110 and a rear flange 120. The stator with its windings and the rotor of the electrical machine are contained in sealed enclosure 130. The inside of enclosure 130 is better shown in FIG. 12, described in detail hereafter in connection with the motor cooling system. A terminal box (not referenced) where the connections are made is fastened onto enclosure 130, in particular at flange 110 that closes the enclosure at the front of the motor. Enclosure 130 and flanges 110 and 120 are made of metal, aluminium or iron for example.

According to the first embodiment of the invention, the external cooling includes an external fan 140 arranged opposite the outer face of rear flange 120 and is fixedly mounted on rotating shaft 160 of the rotor, to send outside air along enclosure 130 in the direction of front flange 110.

Shaft 160 which rotates about axis (X) is carried by the front 110 and rear 120 flanges respectively located at two opposite front and rear ends of enclosure 130. The front flange 110, which is arranged at a first end of enclosure 130, supports the drive side of the load of rotating shaft 160, and rear flange 120, which is arranged at a second end of the enclosure opposite the first end, supports the side opposite the drive side of the load of rotating shaft 160.

In the rest of the description, the side of the machine where a load is driven by the rotating shaft of the rotor is referred to as front part of the machine, and the opposite side is referred to as rear side of the machine.

Figure 7:
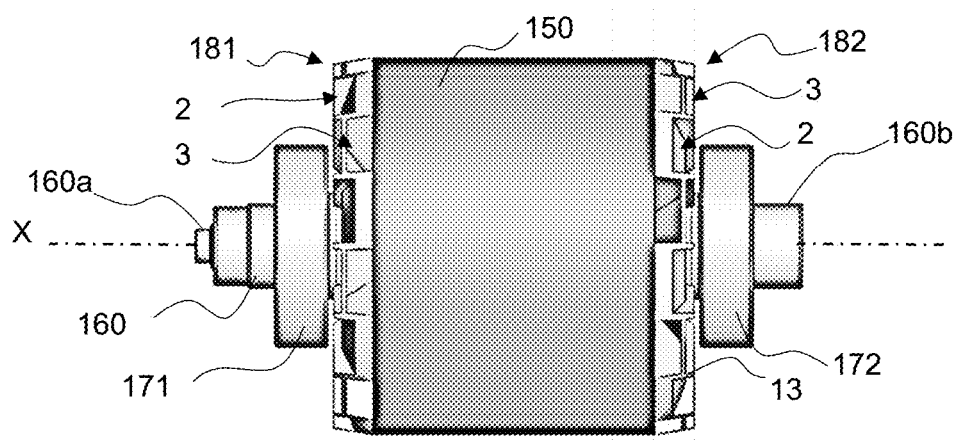
FIG. 7 is a side view of the rotating part of the electrical machine according to the invention including the two internal fans.

More specifically, the front 110 and rear 120 flanges each comprise an inner face (111, 121), an outer face (112, 122) and a central housing (116a, 126a) positioned in a median part of inner face (111, 121), which receives a bearing, as shown in FIGS. 10A, 10B, 11A and 11B. Bearings 171 and 172, which are shown in FIG. 7, support the drive side of a load 160a of rotating shaft 160 and the side opposite the drive side of load 160b of the rotating shaft.

The front flange 110 and rear flange 120 comprise seals which tightly seal the enclosure 130.

FIG. 2 is a perspective view of the rotating part of the electrical machine on which are mounted two internal fans 181 and 182 of the cooling system of the machine according to the invention.

Indeed, according to the invention, the cooling system comprises a pair of internal fans (181, 182), with each internal fan being fixedly mounted on rotating shaft 160 between the body of rotor 150 and one of the bearings (171, 172). Upon rotation of the shaft, the pair of internal fans (181, 182) provided within enclosure 130 and are integral with the shaft creates, a first two-way air flow inside the rotor, through recesses 28 forming the magnetic flux barriers, and a second air flow between each internal fan and the inner face of the flange positioned opposite the fan.

The internal fans axially inject air into the rotor, configured as a two-way air flow, which cools of the internal magnets of the rotor. The fans also, by interacting with the flanges, cool the stator winding heads, as well as the shaft and the rotor of the electrical machine, resulting from of the second air flow within the enclosure.

Before describing in detail the cooling process inside enclosure 130, the structure of the rotor and of the internal fans is detailed hereafter.

Rotor 150 of the machine, which rotates in the stator, comprises a body fastened to rotating shaft 160. The rotor comprises, in a known manner, a bundle of identical plane laminations 14, which are preferably ferromagnetic. The rotor comprises a plurality of magnetic flux generators 16, which are permanent magnets formed into rectangular bars whose length is substantially equal to the length of the rotor body and which are surrounded by flux barriers which are axial recesses 28 (elongate along axis X) running throughout laminations 14. Magnetic flux generators 16 are housed in axial recesses running throughout the rotor. Magnetic flux generators 16 and the axial recesses 28 forming the flux barriers are radially distributed in the rotor to form magnetic poles 20, 28 for example, as illustrated in FIG. 2.

FIG. 3 shows in detail the rotor of the machine in a radial cross-sectional view. Flux generators 16 are not shown. Laminations 14 of circular shape comprise a central bore 18 traversed by rotating shaft 160 and a plurality of axial recesses running throughout the laminations.

As is well known, the laminations are assembled together by matching the bores and the recesses by any known technique means, such as gluing, pressing, etc. Thus assembled, the laminations form the body of rotor 150 carrying shaft 160.

In this configuration, the body comprises a first series of axial recesses 22 housing magnetic flux generators 16 and another series of axial recesses 28 creating magnetic flux barriers.

The first series of axial recesses 22 has the shape of a quadrilateral as for example as a rectangle as shown.

These recesses 22 receive magnetic flux generators 16 (not shown), e.g. permanent magnets in a form of rectangular bars of equal length substantially equal to the length of the body. These recesses are referred to as "housings" in the rest of the description below.

These housings 22, which are three here, are radially arranged above one another and at a distance from one another from center O of bore 18.

This series of three housings is circumferentially repeated around point O, along four axes AA', BB', CC' and DD' offset by an angle of 45° to form a succession of series of housings evenly distributed around point O.

Thus, as illustrated in FIG. 3, each semi-axis (OA, OA'; OB, OB'; OC, OC'; OD, OD') carries three axial housings 22 whose faces of greater length are perpendicular to the semi-axes and whose face dimensions decrease from center O to the periphery of the lamination.

The housing 22 closest to bore 18 has a material bridge 24 with the bore and a material bridge 26 remains between each housing.

The housing 22 furthest from bore 18 is positioned at a distance from the peripheral edge of the body.

The other series of recesses is made up of perforations 28 of substantially constant thickness "e" and of inclined radial direction, starting from housings 22 and ending in the vicinity of the edge of laminations 14. These perforations start from lateral edge 30 of housings 22 and form an angle α from a plane passing through one of the faces of greater length of the housings and ending in this vicinity.

As shown in FIG. 3, the inclined perforations are arranged symmetrically relative to housings 22. More precisely, a series of three inclined perforations is positioned on one side of the semi-axis and another series of three inclined perforations is positioned on the other side of this semi-axis.

Thus, a substantially V-shaped plane-bottomed geometric figure is formed each time, the plane bottom is formed by housing 22 and the inclined arms of this V is formed by perforations 28. Three superposed V-shaped forms are thus obtained on each semi-axis, positioned at a distance from one another, with height and width dimensions decreasing from bore 18 to the periphery of the body.

Thus, in addition to material bridges 24, 26, a solid portion 32 remains between inclined perforations 28 of each V shape, and another solid portion 34 remains between the perforation 28 closest to bore 18 of a series of three V shapes and the perforation 28 closest to bore 18 of a neighbouring series of three V shapes.

Flux barriers formed by perforations 28 are thus created. The magnetic flux from the magnets then can only transit through the material bridges and the solid portions. A flux barrier is considered to be formed by two perforations 28 arranged on either side (on each side of the semi-axis) of a magnet housed in a housing 22 and starting from edges 30 of the housing 22.

Each set made up of the three magnetic flux generators 16 housed in the three housings 22 is aligned along a semi-axis (OA, OA'; OB, OB'; OC, OC';OD, OD') and the three perforations 28 on either side of the magnets, that is the six perforations 28 for the three magnets, form a magnetic pole 20 of the rotor which are eight here. In the rotor of the machine according to the invention, each magnetic pole comprises at least one magnet and at least one magnetic flux barrier.

The number n of magnetic poles 20 of the rotor, created by flux generators 16 and the flux barriers, is an even integer preferably ranging between 2 and 12, preferably equal to 4 or 8, and preferably equal to 8 as illustrated in FIG. 3. The number of poles mainly depends on the diameter of the rotor. Generally, the larger the number of poles, the higher the torque with less current, but the more complex the control of the motor becomes because this impacts the electrical frequency thereof.

The body of rotor 150 can further comprise, in material bridge 24 and in the vicinity of bore 18 receiving shaft 160, cavities 36, for example eight cavities in the form of a quadrilateral as illustrated in FIG. 3, evenly distributed around center O, preferably between each semi-axis, to lighten the rotor. These cavities 36 are elongate along axis X in the rotor and they run therethrough (from the front to the rear of the machine). Cavities of this type, which can have a closed section of a different shape, such as polygonal or pentagonal, may also be used for receiving rotor dynamic balancing masses. The balancing masses can be, for example, balls or bars of circular section. Cavities 36 can be generated by punching on each lamination and assembly of the laminations with one another, thus forming this cavity.

Figure 8A:
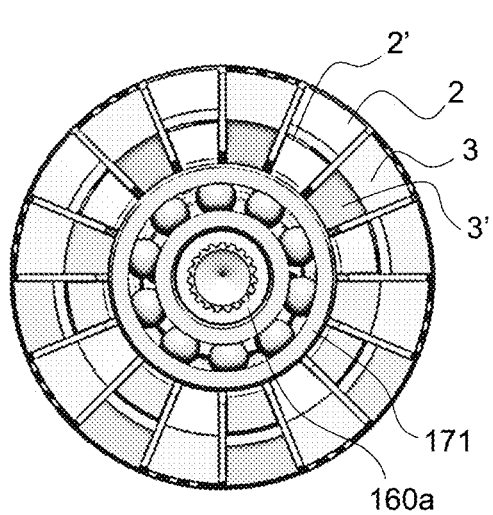
FIGS. 8A and 8B are the identical front views of one end (front) of the rotating part of the electrical machine according to the invention including an internal fan with FIG. 8B showing the internal fan in transparent view.
Figure 8B:
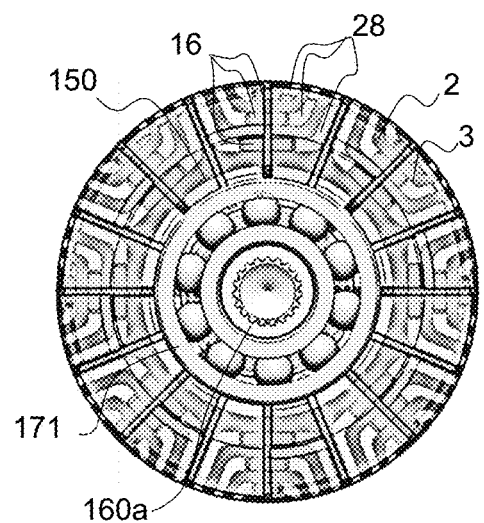

In connection with FIG. 2, but also with FIG. 7 showing the rotating part of the electrical machine provided here with the two internal fans 181 and 182 in side view, first internal fan 181 is fixedly mounted on rotating shaft 160, between the body of rotor 150 and bearing 171 supporting rotating shaft 160 on load drive side 160a. It is therefore positioned as arranged at the front side of the motor and faces inner face 111 of front flange 110 of the motor. Symmetrically, internal fan 182 is fixedly mounted on rotating shaft 160, between the body of rotor 150 and bearing 172 supporting rotating shaft 160 on the side opposite load drive side 160b. It is thus positioned at the rear of the motor and faces inner face 121 of rear flange 120. Bearings 171, 172 are for example ball bearings, as is visible in FIGS. 8A and 8B showing the front face of the rotating part illustrated in FIG. 7. Internal fans 181 and 182 are for example made of aluminium and obtained by die casting.

The two internal fans 181 and 182 have identical structures.

Figures 4A, 4B:
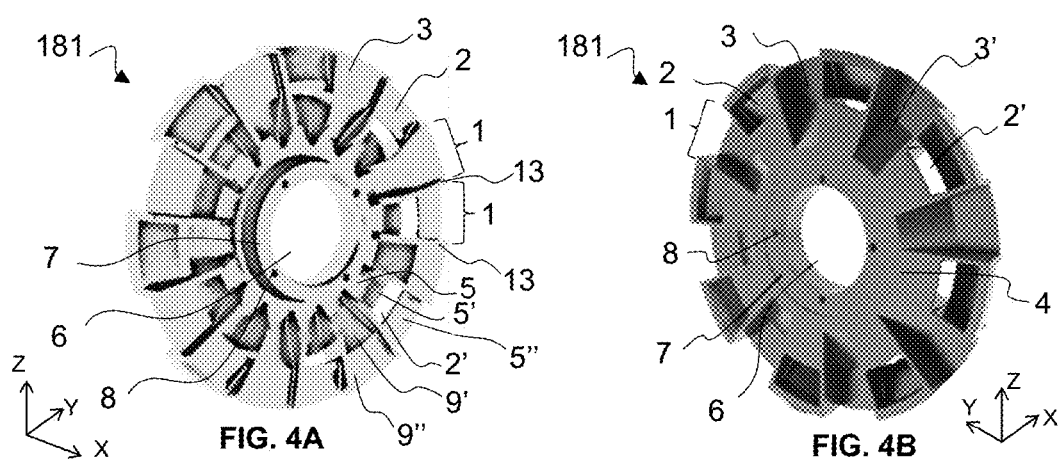
FIGS. 4A and 4B are perspective views respectively of the outer face and the inner face of an internal fan of the electrical machine according to the invention.
Figures 5A, 5B:
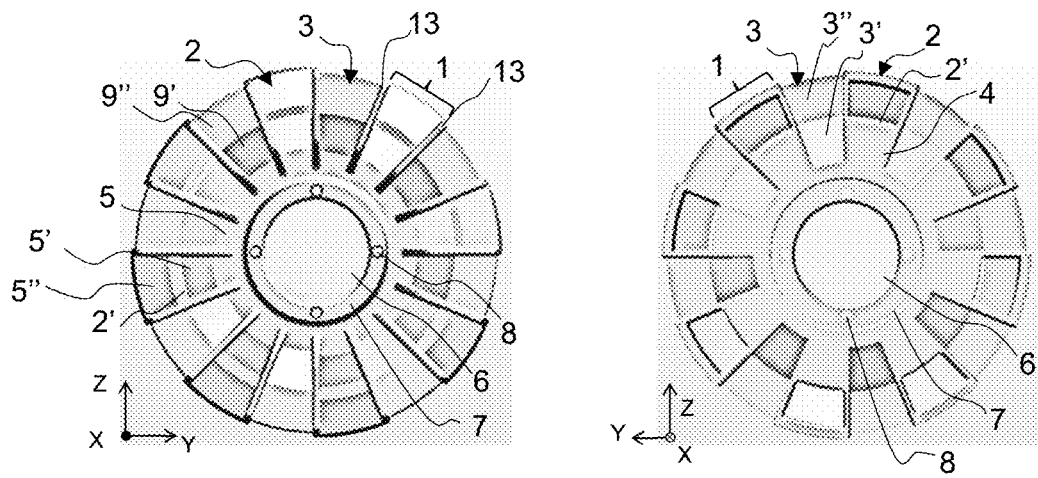
FIGS. 5A and 5B are front views respectively of the outer face and the inner face of an internal fan of the electrical machine according to the invention.

To create the specific air circulation within the enclosure, internal fans 181, 182 preferably each have the following structure with each internal fan (181, 182) comprising:
- an inner face, as shown in FIGS. 4B and 5B, oriented towards the body of rotor 150,
- an outer face, as shown in FIGS. 4A and 5A, oriented towards the flange closing the enclosure,
- a central opening 6 allowing passage of rotating shaft 160, and
- an alternation of open radial sectors 2 and closed radial sectors 3 dividing the surface of the fan and separated by radial walls orthogonal to central axis (X), the walls forming protruding blades 13 on the outer face of the fan. Closed radial sectors are understood to be radial sectors with no orifice in the axial direction.

Open radial sectors are understood to be radial sectors having at least one orifice in the axial direction.

Figures 9A, 9B:
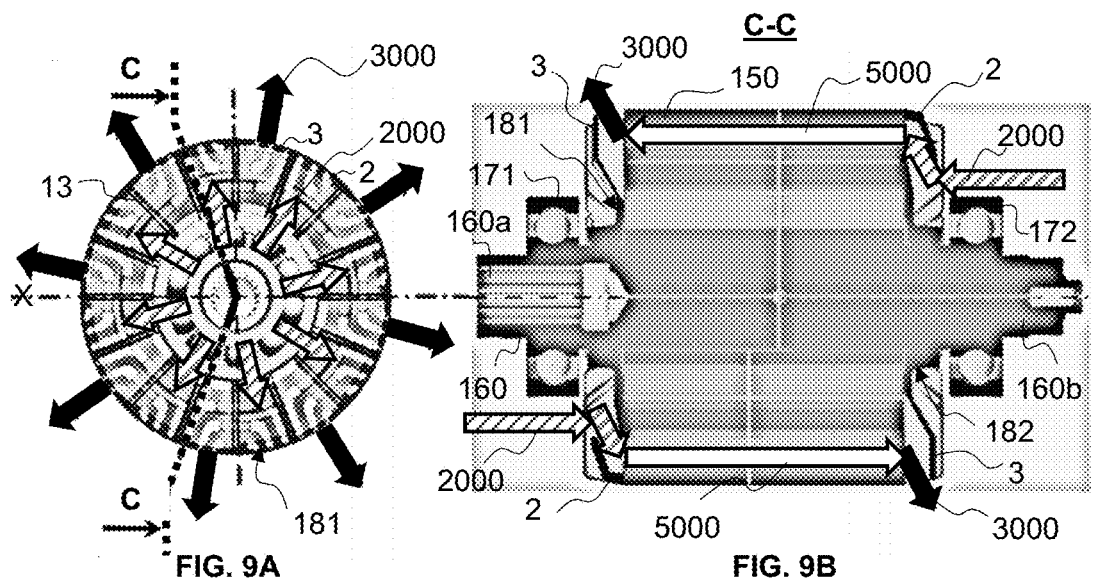
FIGS. 9A and 9B illustrate the air circulation in the rotor, which respectively are a front view of one end of the rotating part of the electrical machine according to the invention and a cross-sectional view along a section C-C shown in FIG. 9A.

Open radial sectors 2 comprise openings 2' in the longitudinal direction, that is in the axial direction of the shaft which direct air flow into recesses 28 of the rotor, while closed radial sectors 3 comprise a surface, with no orifice, which is a ramp (3, 3', 3") which allows the air circulating in recesses 28 of the rotor to flow out of the recesses according to a circulation pattern described hereafter in connection with FIGS. 9A and 9B.

The surface of the internal fan is more precisely divided into 2n radial sectors 1 each having an even angular distribution. The 2n radial sectors are distributed according to an alternation of open radial sectors 2 and closed radial sectors 3. The number of open radial sectors 2 is equal to the number of closed radial sectors 3. The angle β formed between two radial walls delimiting each radial sector 1 is 360/(2n). It is noted that n is the number of magnetic poles 20 of the rotor. Preferably, n ranges between 2 and 12, is preferably equal to 4 or 8, and is more preferably 8. Thus, the internal fan comprises 8 radial sectors 1 when the rotor comprises 4 magnetic poles, and 16 radial sectors 1 in the more preferred case where the rotor comprises 8 magnetic poles, as represented in the figures. When the rotor comprises 8 magnetic poles, the internal fans each comprise 16 radial sectors with an angle β of 22.5°.

The internal fans preferably have a circular shape with the inner face thereof comprising a plane part 4 orthogonal to central axis (X) and resting on the body of rotor 150. The orthogonal plane part 4 stretches radially from central opening 6 to the periphery of the fan, and is extended by an inclined plane part 3' which is inclined relative to the plane of plane part 4, starting from plane surface 6 and stretching towards the periphery of the fan, at closed radial sectors 3. The part 3' extends with a plane part 3" orthogonal to axis X', and thus is parallel to plane part 4, through an opening 2' at open radial sectors 2. The opening is in the axial direction of the rotor shaft with the opening being partly delimited by radial lateral walls 13. What is meant by "opening" is that this part can comprise at least one passage hole. Parts 4, 3' and 3" at closed radial sectors 3 create a surface shaped as a ramp directing air flow from recesses 28 to glide on surface ramp to flow towards the stator.

Plane part 4 of the inner face of the internal fans covers the part of the body of rotor 150 comprising cavities 36 at each open radial sector 2, which creates an air circulation only in the flux barriers formed by recesses 28.

Fans 181 and 182 can comprise a fastening ring 7 for securing them to the body of rotor 150 which is provided with passage holes 8 for screws, possibly for improving or replacing an attachment through pressure of the internal fan onto rotating shaft 160. Ring 7 can then form central opening 6 of the internal fan. Ring 7 protrudes from the outer face of fans 181 and 182.

The outer face of the internal fans comprises axially protruding blades 13 having radial walls that separate radial sectors 1, which direct the air to flow through openings 2' of open radial sectors 2 into recesses 28 to provide in part the air circulation achieved between each internal fan and the inner face of the front or rear flange, by directing the air towards the winding heads of the stator. Blades 13 originate from the vicinity of central opening 6, on the edge of ring 7.

The outer face of the internal fans comprises a plane part 5 which is orthogonal to axis (X) that surrounds ring 7 and carries the ends of protruding blades 13. At an open radial sector 2, plane part 5 extends toward the periphery of the fan by an inclined plane part 5' forming a bevel with plane part 4 of the inner face of the face to provide room for opening 2'. At a closed radial sector 3, plane part 5 extends towards the periphery of the fan by an inclined part 9' parallel to part 3' of the inner face which itself is extended by a part 9" parallel to part 3" of the inner face.

Figure 6A:
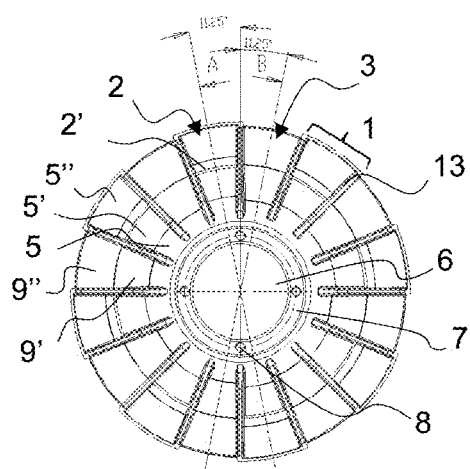
FIGS. 6A, 6B and 6C are respectively a diagram of the outer face of an internal fan of the electric machine according to the invention, a cross-sectional view thereof along a section A-A (6B) and along a section B-B (6C), with both sections being represented in the diagram of FIG. 6A.
Figure 6B:
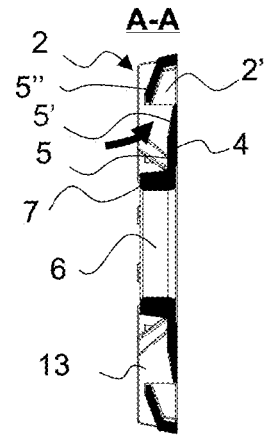
Figure 6C:
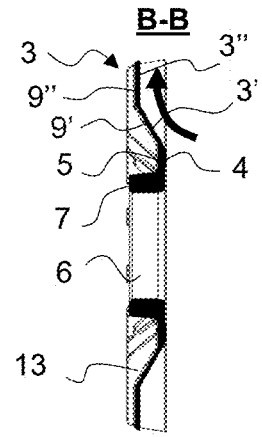

This structure of the closed 3 and open 2 radial sectors is clearly visible in FIGS. 6B and 6C which corresponds to cross-sectional views respectively of an open radial sector 2, along line A-A shown in FIG. 6A, and of a closed radial sector 3, along line B-B shown in FIG. 6A. The arrows in FIGS. 6B and 6C represent the air flowing into and from the rotor. FIG. 6A is a schematic view of the outer face of an internal fan.

Each internal fan is mounted with two adjacent closed and open radial sectors covering a magnetic pole of the rotor. This configuration is clearly visible in FIGS. 8A and 8B showing the front face of the rotating part of the electrical machine provided with fan 181. FIG. 8B is identical to FIG. 8A, except that fan 181 is shown in transparent view for better understanding of the arrangement of the open and closed radial sectors relative to the magnetic poles of rotor 150, comprising magnets 16 surrounded by the magnetic flux bafflers made up of recesses 28. FIG. 9A provides the view of FIG. 8B showing the front face of the rotor part fitted with fan 171, in which hatched white arrows 2000 and full black arrows 3000 respectively illustrate the inside air entering the rotor through open radial sectors 2 and leaving the rotor through closed radial sectors 3 upon rotation of the rotor.

Furthermore, the two internal fans 181, 182 are mounted with an angular offset on the rotating shaft, of an angle β equal to 360/(2n). This offset allows matching an open sector 2 of an internal fan to a closed sector 3 of the other internal fan along the same axis substantially parallel to central axis (X), as illustrated in FIG. 7.

It is thus possible to create a two-way air flow within the rotor, as illustrated in FIG. 9B that shows a cross-sectional view of the electrical machine along section C-C' drawn in FIG. 9A The air on the inside flows in on one side of the machine through opening 2' of an open radial sector 2, as illustrated by arrows 2000, then circulates in recesses 28 provided on the same side of magnets 16, as illustrated by solid white arrows 5000, and finally flows out on the other side of the machine through a closed radial sector arranged in the axial extension of open radial sector 2, by use of the offset mounting of the fans with angle β. The direction of circulation of the air is for example from the rear to the front of the machine, as illustrated in the upper part of FIG. 9B. At the same time, for the same magnetic pole of the rotor, the inside air enters the rotor, circulates therein and flows out in the opposite direction, from the front to the rear of the machine, at recesses 28 located on the other side of the magnets 16, according to the circulation pattern shown in the lower part of FIG. 9B. A two-way air flow is thus generated in the rotor, a machine front/rear direction and an opposite machine rear/front direction with air circulating in one direction in axial recesses 28 being provided on one side of the magnets and in the opposite direction for the recesses provided on the other side of the magnets, for each magnetic pole.

The two-way air flow in the rotor allows flux generators 16 which likely are hot to release their heat so as to be efficiently cooled. The circulating air carries heat released by the flux generators to the flanges and to the enclosure via the second inside air flow achieved between each internal fan and the inner face of the front or rear flange.

This second inside air flow is better described hereafter.

The front 110 and rear 120 flanges sealing enclosure 130 are involved in the inside air circulation and in the electrical machine cooling.

Figures 10A, 10B:
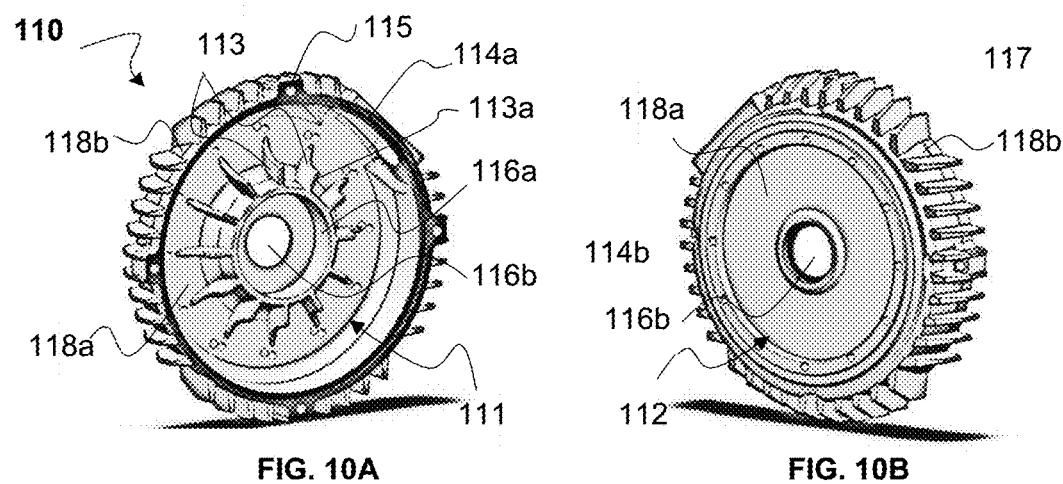
FIGS. 10A and 10B are perspective views respectively of the inner face and the outer face of the front flange of the electrical machine according to the first embodiment of the invention.

Front flange 110 is shown in FIGS. 10A and 10B.

Front flange 110 comprises a central part in form of a crown 118a and a peripheral part of cylindrical shape 118b.

Front flange 110 comprises an inner face 111 turned towards the inside of enclosure 130, visible in FIG. 10A, an outer face 112, visible in FIG. 10B, and a central housing 116a positioned in the median part of the inner face, intended to receive bearing 171. This housing 116a comprises, in the center thereof, an orifice 116b which provides for passage of rotating shaft 160 of the rotor. Seals (114b, 114a) are provided at orifice 116b which provides passage of shaft 160 and over the perimeter of peripheral part 118b which contacts enclosure 130. Peripheral part 118b of flange 110 also comprises attachment points 115, which are four for example, as illustrated, for fastening front flange 110 to enclosure 130.

According to the invention, inner face 111 of front flange 110 comprises a set of fins 113 located on the periphery of central housing 116a. The purpose of these fins 113 is to orient the air flow created by the rotation of internal fans (181, 182) which leaves rotor 150, as described hereafter in connection with FIG. 14, and to capture the heat of the air flow. Inner face 111 of front flange 110 comprises for example twelve fins 113.

Fins 113 are preferably evenly distributed around housing 116a. Preferably, the fins and the flange body form a single entity (monobloc), manufactured using a mold for example. Advantageously, the shape of the fins is such that they contribute to a specific inside air circulation for efficiently cooling the winding heads and the rotating part of the machine. Each fin is preferably plane and it has a general trapezoidal shape having bases (parallel opposite sides) which are orthogonal to axis (X), and whose side opposite housing 116a is curved to have a concavity (relative to a point located on the periphery 118b of the flange in a radial extension of the fin). This concavity of the fin edge provides optimum proximity to the winding heads while providing optimized air flow for efficient cooling. This description of the fins is based on the visible parts at the surface of the flange (and not based on a cross-section of the flange). According to a cross-sectional view through the fin, the latter has the general shape of a right-angled trapezoid whose side forming a right angle with the bases makes up the wall of housing 116 (visible in FIG. 14). The inner fins have the shape of a bird's wing whose scapular part would be opposite the inner face of the flange. The dimensions of the fins are such that a maximum space is provided between the internal fan and the top portion of the fins 113a opposite the internal fan, to have a proximity to the internal fan suited for good air circulation in the space left between the flange and the internal elements of the machine. By way of non-limitative example, a 4 to 5-mm space is left between the internal fan and top 113a of the fins, for a device comprising flanges with an inside diameter of approximately 20 cm, provided with approximately 20 mm-long internal fins, the length (or height) of the fins being understood to be the dimension of the fins along axis (X).

Figure 13:
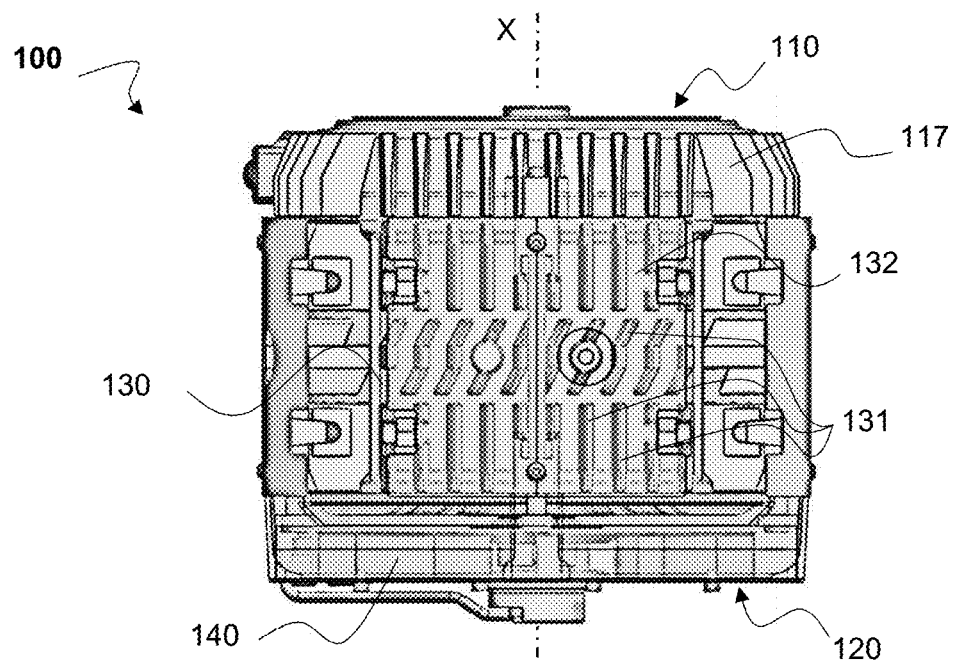
FIG. 13 is a top view of the electrical machine according to the first embodiment of the invention.

Preferably, the peripheral part 118b of front flange 110 further comprises heat dissipation fins 117 on the outer face 112 thereof. Heat dissipation fins 117 are substantially elongate along an axis parallel to axis (X) of the rotor. When enclosure 130 has an outer surface comprising a set of cooling fins 131, as shown in FIG. 13, fins 117 of front flange 110 then form an extension of the passages provided by cooling fins 131 of enclosure 130.

Figures 11A, 11B:
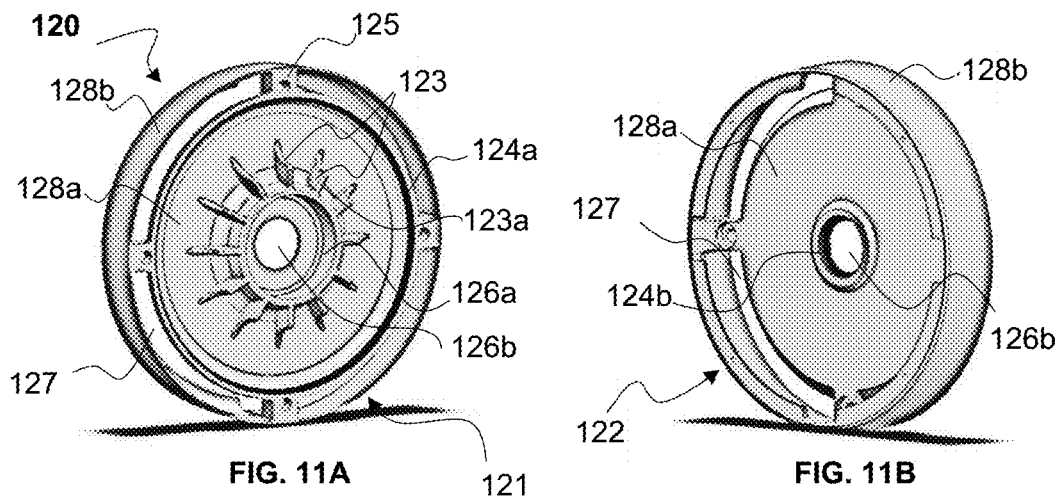
FIGS. 11A and 11B are perspective views respectively of the inner face and the outer face of the rear flange of the electrical machine according to the first embodiment of the invention.

Rear flange 120 is shown in FIGS. 11A and 11B.

Rear flange 120 comprises a central part in form of a crown 128a connected to a cylindrical peripheral part 128b.

As with front flange 110, rear flange 120 comprises an inner face 121, turned towards the inside of enclosure 130, visible in FIG. 11A, an outer face 122, visible in FIG. 11B, and a central housing 126a positioned in the median part of the inner face, intended to receive bearing 172. This housing 126a comprises at the center thereof an orifice 126b providing passage of rotating shaft 160. Seals (124b, 124a) are provided at orifice 126b providing passage of shaft 160 and over the perimeter of peripheral part 128b to come into contact with enclosure 130. Peripheral part 128b and central part 128a of rear flange 120 comprise connections 125 that also include the attachment points for fastening the flange to the enclosure. For example, the rear flange comprises four connections 125 with four attachment points (orifices for passage of a screw for example).

According to the invention, inner face 121 of rear flange 120 comprises, in the same way as front flange 110, a set of fins 123 arranged on the periphery of bearing housing 126a. The purpose of these fins 123 is also to orient the air flow created by the rotation of the internal fans and leaving rotor 150, as described below in connection with FIG. 14, to capture the heat of the air flow. Inner face 121 of rear flange 120 comprises twelve fins 123 for example.

Fins 123 are preferably evenly distributed around housing 126a. Their shape and their dimensions are preferably identical to those of fins 113 of inner face 111 of front flange 110 described above. As for fins 113, the dimensions of fins 123 are such that a maximum space is provided between the internal fan and the top portion of the fins 123a opposite internal fan 182.

Rear flange 120 comprises at least one opening 127 provided between central part 128a and peripheral part 128b for orienting the outside air sent by external fan 140 along enclosure 130, notably for sending this air to passages formed by the set of cooling fins 131 of the outer surface of enclosure 130. Rear flange 120 comprises for example four such openings, as illustrated in FIGS. 11A and 11B. These openings 207 have for example a circular arc shape and they are uniformly distributed over the perimeter of central part 128a of flange 120.

Figure 12:
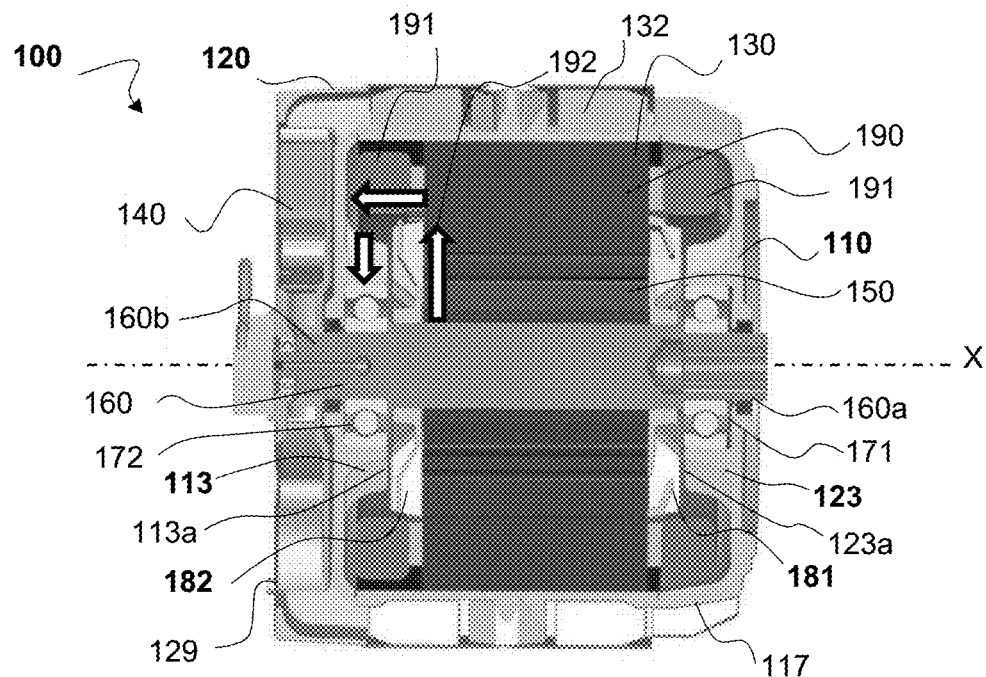
FIG. 12 is a longitudinal cross-sectional view of the electrical machine according to the first embodiment of the invention.

FIG. 12 is a cross-sectional view of motor 100 according to the first embodiment of the invention, showing in detail the elements of the machine and illustrating the air flow between each internal fan and the inner face of the front or rear flange within the sealed enclosure (air flow 192 shown by the arrows) caused by the interaction between internal fans 181 and 182 in operation and the structural elements of the machine within enclosure 130, notably the structure of the inner faces of flanges 110 and 120.

Motor 100 comprises stator 190, arranged in enclosure 130, comprising windings in which the rotor 150 is fastened to rotating shaft 160. The motor cooling system comprises on the one hand the pair of internal fans 181 and 182, interacting with the fins of the flanges, and on the other hand external cooling that is external fan 140 according to the first embodiment, for cooling the enclosure and the front and rear flanges.

In addition to creating a two-way air flow within the rotor, internal fans 181 and 182, upon rotation of the rotor, interact with fins 113 and 123 of inner faces 111 and 121 of front and rear flanges (110, 120) to create air flow between each internal fan and the inner face of a flange, whose heat is captured by the fins of the inner faces of the flanges.

More specifically, fins (113, 123) of inner face (111, 121) of the front and rear flanges (110, 120) direct air flow 192 leaving the rotor radially towards winding heads 191 of stator 190 (flow in a direction that is centrifugal about axis (X) of rotating shaft 160), then send the air to flow back from winding heads 191 to the center of the flange, first in a direction parallel to axis (X) at the winding heads, then radially towards the rotating shaft (flow parallel to axis (X), then in a centripetal direction about axis (X)). Such an air flow is thus achieved on the front side and the rear side of the motor, on either side of rotor 150. The fins of the inner faces of flanges 113 and 123, in addition to orienting the inside air flow leaving the rotor, dissipate the heat of the air flow and thus cool winding heads 191, as well as shaft 160 and rotor 150 of the electrical machine.

The heat of the inside air is partly discharged by contact with the flanges and the enclosure of the electric machine.

Fan 140, positioned on the outer face of rear flange 120, contributes to cooling enclosure 130 and the flanges by generating an outside air flow that is first directed radially towards the periphery of the outer face of rear flange 120, then towards front flange 110 parallel to axis of rotation (X), so as to sweep the outer surface of enclosure 130 preferably provided with cooling fins 131, and preferably topped by metal plates 132 that confine the air flow to the outer surface of enclosure 130.

FIG. 13 corresponds to a top view of the motor according to the first embodiment of the invention, showing in greater detail the outside of the enclosure, notably the lateral part of the motor. Enclosure 130, typically made of metal, iron or aluminium for example, can have on the outer surface thereof a set of cooling fins 131, which are elongated along an axis substantially parallel to axis (X) of the rotor. Substantially parallel to axis (X) means substantially 25° relative to this axis (X). The purpose of these cooling fins 131 is to increase the exchange surface of the enclosure with the air for greater heat dissipation, and to direct the outside air flow towards the surface of the enclosure to cover the entire length of the enclosure, from one flange to another. An outside air passage continuity is created when the peripheral part of front flange 110 also comprises dissipation fins 117, preferably oriented in the same direction as the cooling fins of enclosure 130, thus improving cooling of the enclosure and of the front flange.

Advantageously, the electrical motor further comprises metal plates 132, preferably made of aluminium, mounted on enclosure 130 and surrounding cooling fins 131 to direct the air close to the outer surface of enclosure 130 and cooling fins 131 as it circulates along the enclosure. In the example of a motor shown in FIG. 13, metal plates 132 are slightly curved to follow the shape of the outer surface of the enclosure. In FIG. 13, metal plates 132 are shown in transparent view reveal the structure topped thereby. The same applies to rear flange 120, thus revealing external fan 140 in transparent view. Metal plates 132 are preferably evenly distributed around the enclosure, for example eight plates are attached to the enclosure, grouped by pairs to form units spaced around the enclosure.

Metal plates 132 are mounted on the enclosure in such a way that a passage is provided for circulation of the outside air sent by external fan 140. Thus, as can be seen in FIG. 14A described below, metal plates 132 can rest on the peripheral part of rear flange 120.

The outside air preferably flows through the passages provided between cooling fins 131 substantially elongated along axis (X), while being confined to the space formed between the metal plates and the outer surface of enclosure 130. Advantageously, openings 127 of rear flange 120 provide a passage for the outside air sent by fan 140 from the outer face of the flange to the outer surface of enclosure 130 preferably provided with cooling fins 131.

Figure 14A:
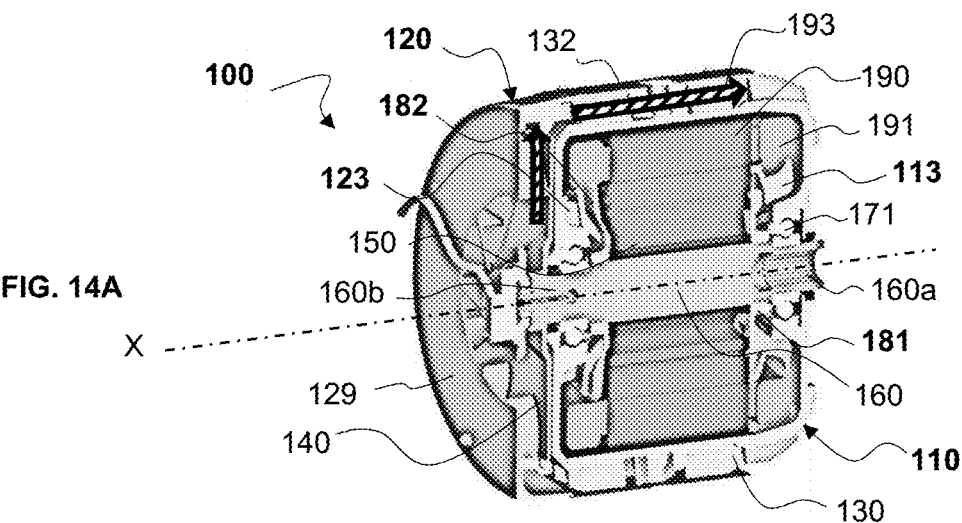
FIGS. 14A, 14B and 14C are perspective views with cutaway of the rear part (FIG. 14A) and the front part (FIG. 14B) of the electrical machine according to the first embodiment of the invention, and a longitudinal cross-sectional view (FIG. 14C) of the electrical machine that illustrates the outside air flow generated by the external fan and circulating outside the enclosure.
Figure 14B:
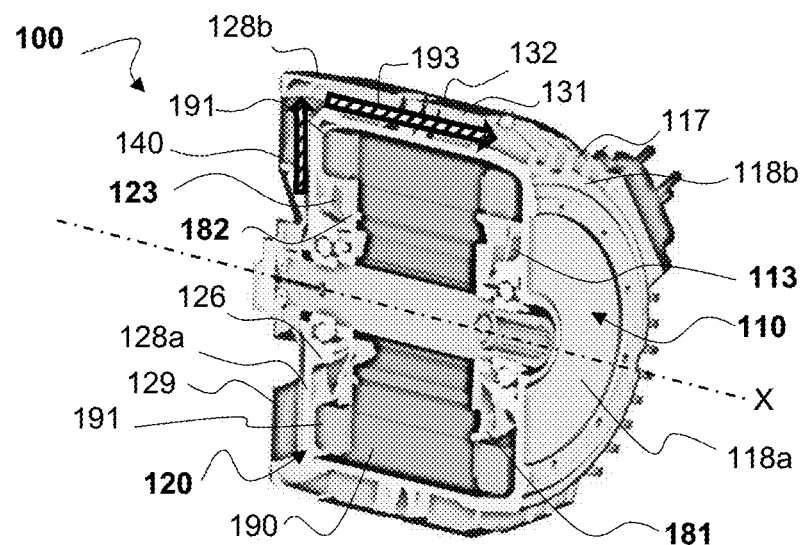
Figure 14C:
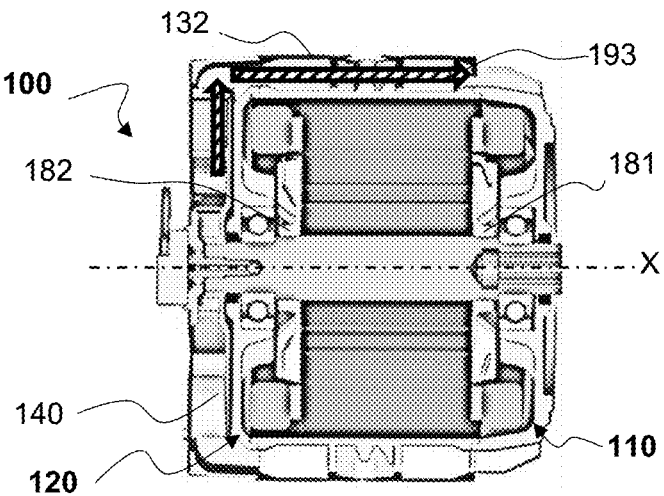

The outside air flow is shown by arrows 193 in FIGS. 14A, 14B and 14C illustrating the motor according to the first embodiment, respectively in rear view, front view and longitudinal view.

Figure 15A:
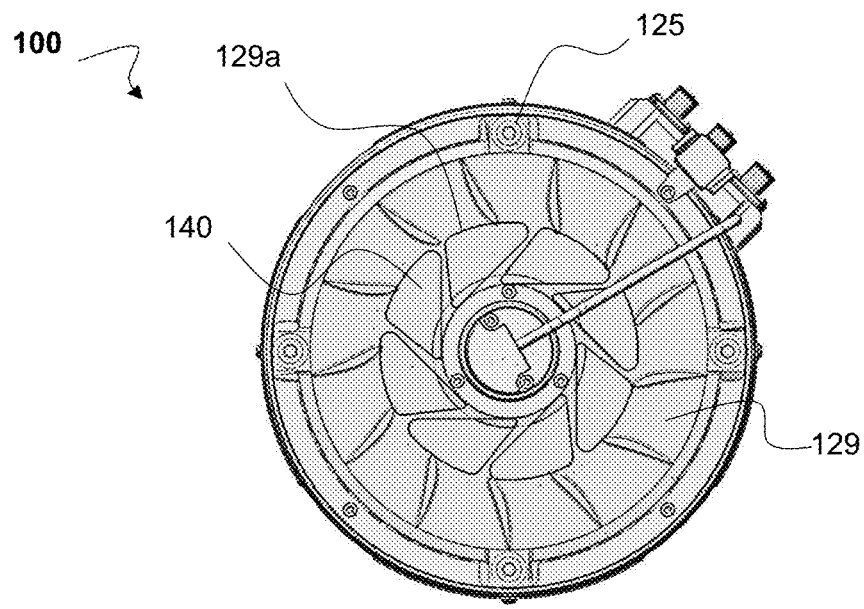
FIGS. 15A and 15B are respectively a plan view of the rear face of the electrical machine and a perspective view of this rear face according to the first embodiment of the invention.
Figure 15B:
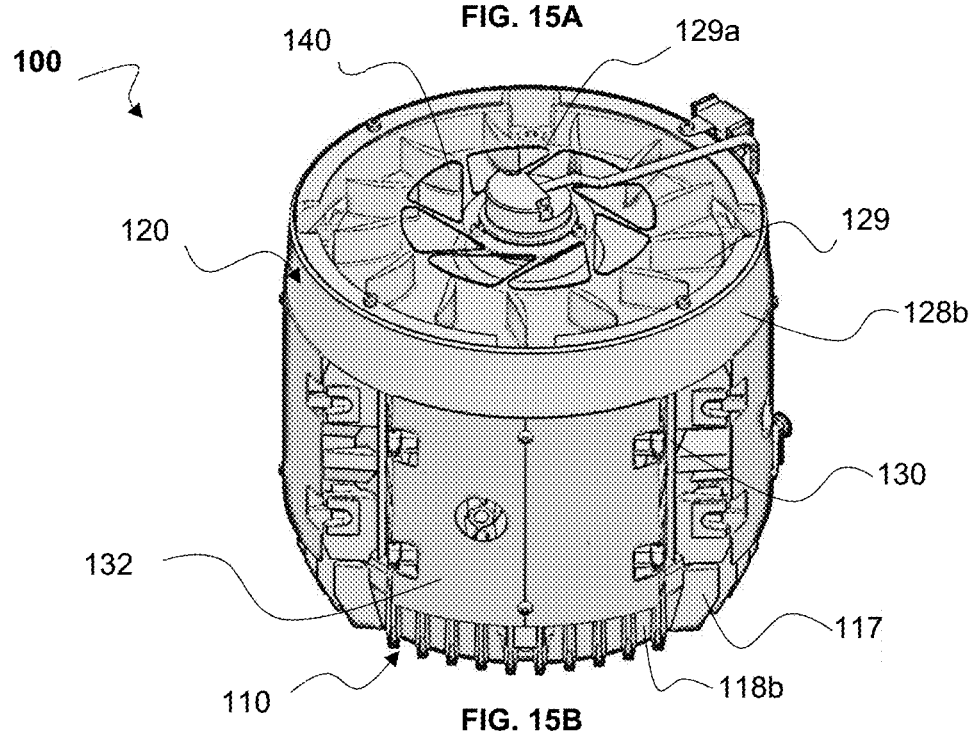

External fan 140 is clearly visible in FIGS. 15A and 15B, respectively a plan view of the rear face and a perspective view of this rear face of the motor according to the first embodiment.

External fan 140 comprises an outside air driving wheel fastened to rotating shaft 160 and a protective plate 129 attached to peripheral part 128b of rear flange 120. Protective plate 129 comprises orifices 129a allowing inflow of the outside air that is sucked by the driving wheel of external fan 140. External fan 140 is of larger dimension than internal fans 181 and 182. The dimension of fan 140 is selected according to the power of the motor and to the maximum rotational speed, so as to ensure optimum cooling. The driving wheel can be a plane surface provided with cooling fins, 13 for example, as shown in FIGS. 15A and 15B, evenly distributed around central axis (X).

According to a second embodiment, illustrated in FIGS. 16A, 16B, 16C and 17A, 17B, 17C, the machine according to the invention comprises a device for cooling the enclosure of the motor with a liquid.

Similarly to the motor according to the first embodiment of the invention, motor 200 comprises;
a stator 290 disposed in an enclosure 230, said stator 290 comprising windings,
a rotor 250 comprising a body fastened to a shaft 260 rotating about a central axis (X), with rotor 250 being mounted to rotate in the stator and comprising housings 22 receiving magnetic flux generators 16 and recesses 28 forming flux barriers, housings 22 and recesses 28 being elongated and running throughout the rotor body along axis (X);

a pair of bearings (271, 272), each supporting one end of the rotating shaft with a drive side of a load 260a of rotating shaft 260 and a side 260b opposite the load drive side of rotating shaft 260;

a front flange 210 disposed at one end of enclosure 230 and supporting drive side 260a of the load of rotating shaft 260;

a rear flange 220 is arranged at a second end of enclosure 230 opposite the first end, and supports the side opposite load drive side 260b of rotating shaft 260;

the front and rear flanges comprise seals for tightly sealing enclosure 230, and comprising each an inner face, an outer face, and a housing (216a, 226a) positioned in a median part of the inner face for receiving one of the bearings; and a cooling system comprising a pair of internal fans (281, 282) arranged within the enclosure which creates an air flow within the enclosure upon rotation of the rotor, each fan being fixedly mounted on the rotating shaft between the rotor body and a bearing;

the inner face of the flanges comprising fins (213, 223) disposed on a peripheral part of the bearing housing to direct the inside air leaving the rotor and to capture the heat thereof.

According to this second embodiment, cooling of the inside of the machine is identical to that described in connection with the first embodiment of the invention, that is a pair of internal fans which each are fixedly mounted on rotating shaft 260 between the body of rotor 150 and one of the bearings, which create upon rotation of the shaft, a first air flow in recesses 28 of the rotor and a second air flow between each internal fan and the inner face of the front or rear flange, with an interaction between internal fans (281, 282) and fins (213, 223) of the inner faces of the front and rear flanges.

According to this second embodiment, the external cooling for cooling the enclosure and the front and rear flanges comprise a coolant circuit. This circuit has a coolant inlet 233, a coolant outlet 234 and a network of lines 235 in contact with enclosure 230, wherein a coolant such as water or any other liquid suited for cooling the machine circulates in order to cool enclosure 230 and the front 210 and rear 220 flanges.

Figure 16A:
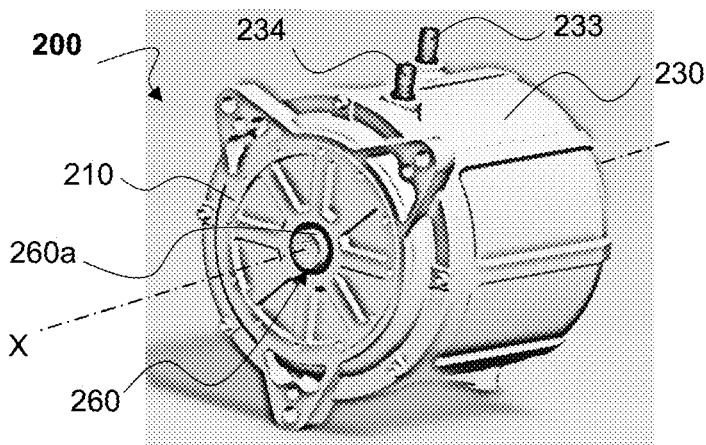
FIGS. 16A and 16B are perspective views respectively of the front part and the rear part of the electrical machine according to a second embodiment of the invention wherein cooling of the machine is carried out by air and by liquid cooling.
Figure 16B:
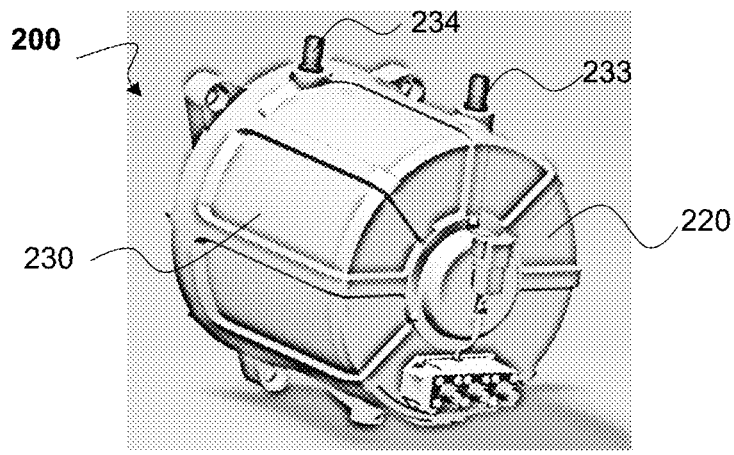
Figure 16C:
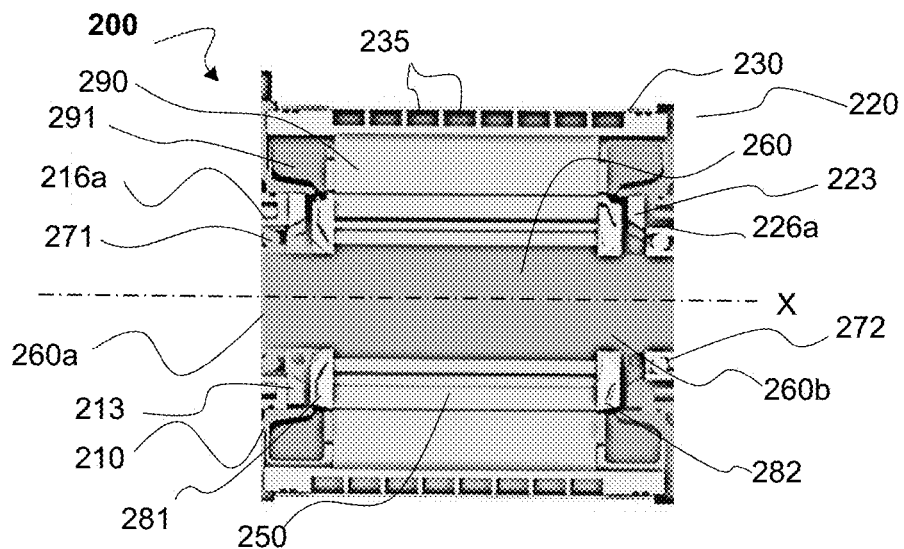
FIG. 16C is a partial longitudinal cross-sectional view of the electrical machine according to the second embodiment of the invention.
Figure 17A:
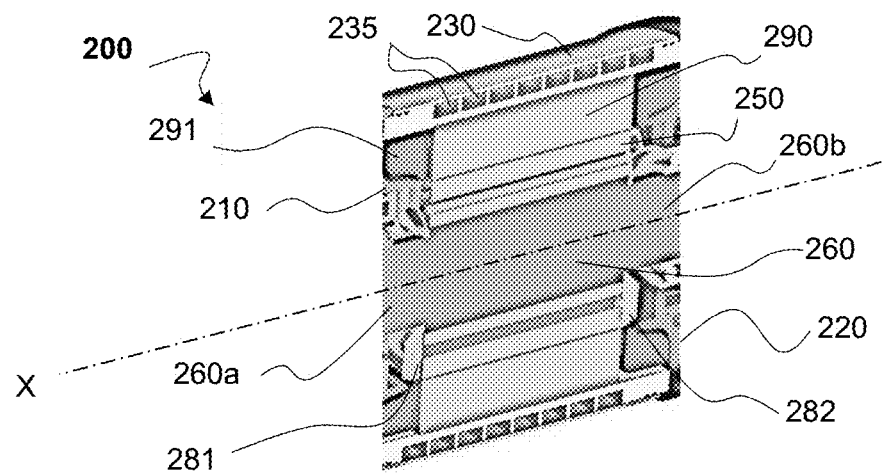
FIGS. 17A, 17B and 17C are partial perspective views with cutaway of the front part (FIG. 17A) and of the rear part (FIG. 17B) of the electrical machine according to the second embodiment of the invention.
Figure 17B:
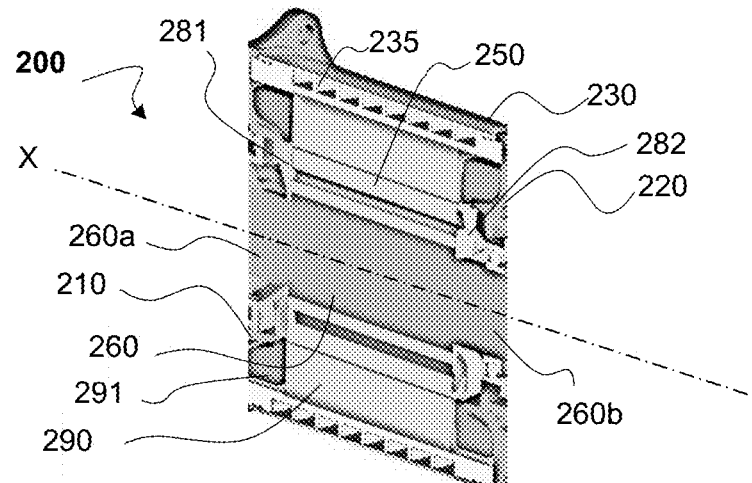
Figure 17C:
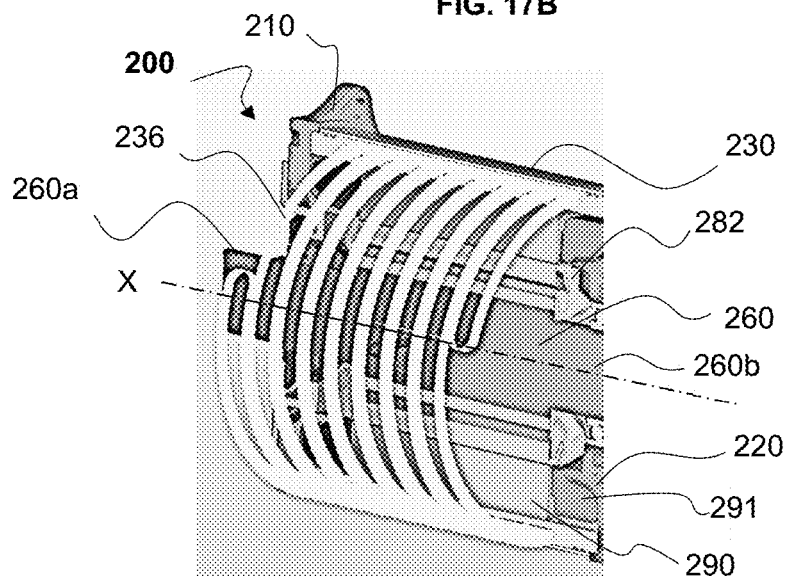

Advantageously, the network of lines is a coil 236 integrated in enclosure 230, as is clearly visible in FIG. 17C, where the water circulation in the coil is represented, openings 235 corresponding to the coil shown in cross-sectional view in FIGS. 16C, 17A and 17B.

In the example of motor 200 shown in FIGS. 16A to 16C and 17A to 17B, the motor is enclosed, and comprises a sealed casing made up of enclosure 230 and the front 210 and rear 220 flanges. The flanges tightly seal the enclosure. More specifically, front flange 210 and part of enclosure 230 form one and the same piece, and rear flange 220 and part of enclosure 230 form a second such piece, the union of the two pieces forming the sealed casing, and allowing the coil to be integrated into enclosure 230.

The coolant circuit allows all of enclosure 230 of motor 200, including flanges 210 and 220, to be cooled by heat exchange between these elements and the coolant.

The present invention advantageously applies to variable synchronous reluctance motors, and preferably to machines with a power ranging between 20 kW and 400 kW. By way of non-limitative example, the motor cooled according to the invention can be a variable synchronous reluctance motor with a constant power of 30 kW, a transient (peak) power of 52 kW, which can operate with a DC bus voltage of 350 V, and it can have the following dimensions: rotor outside diameter 134 mm, stator outside diameter 200 mm, enclosure outside diameter 250 mm, motor length 214 mm, active part (corresponding to the length of the bundles of laminations of the rotor) length 100 mm.

The invention claimed is:

1. A rotary electrical machine with an enclosure comprising:
   a stator disposed in the enclosure and comprising windings;
   a rotor comprising a body fastened to a shaft which rotates about a central axis, the rotor being mounted to rotate in the stator and comprising first recesses housing magnetic flux generators and second recesses providing magnetic flux barriers, the first and second recesses being elongated and running along the central axis;
   bearings which each support one end of the rotating shaft;
   a front flange and a rear flange respectively disposed at two opposite front and rear ends of the enclosure, the front and rear flanges each including a seal for sealing the enclosure, an inner face, an outer face and a central housing receiving one of the bearings, the inner face of the flanges comprising fins disposed on a peripheral part of the central housing; and
   a cooling system comprising internal fans, each internal fan being fixedly mounted on the rotating shaft between the body of the rotor and one of the bearings to provide, upon rotation of the shaft, a first air flow in the second recesses of the rotor and a second air flow between each internal fan and the inner face of the front flange or the rear flange, and wherein
   each internal fan comprises an inner face, an outer face, a central opening for passage of the rotating shaft and an alternation of open radial sectors and closed radial sectors which divide a surface of the internal fan and are separated by radial walls which are orthogonal to the central axis which provide protruding blades on an outer face of the internal fan.

2. An electrical machine as claimed in claim 1, wherein the internal fans are circular in shape with an inner face thereof comprising a plane part resting on the body of rotor and which is orthogonal to the central axis, the plane part extending in an inclined plane part at each closed radial sector and through opening at each open radial sector.

3. An electrical machine as claimed in claim 2, wherein:
   the rotor comprises n of magnetic poles created by the flux generators and the flux barriers;
   each magnetic pole being covered by closed and open radial sectors adjacent to an internal fan; and
   the internal fans are mounted with an offset on shaft to match an open radial sector of one internal fan to a closed radial sector of another internal fan along a single axis parallel to the central axis.

4. An electrical machine as claimed in claim 3, wherein:
   a total number of open and closed radial sectors of an internal fan is 2n, and the two internal fans are mounted with an angular offset on the shaft by an angle β which is equal to 360/(2n); and
   n is an even integer ranging between 2 and 12.

5. An electrical machine as claimed in claim 4, wherein the machine is a variable synchronous reluctance machine.

6. An electrical machine as claimed in claim 2, wherein the machine is a variable synchronous reluctance machine.

7. An electrical machine as claimed in claim 1, wherein:
   the rotor comprises n of magnetic poles created by the flux generators and the flux barriers;
   each magnetic pole being covered by closed and open radial sectors adjacent to an internal fan; and the internal fans are mounted with an offset on the shaft to match an open radial sector of one internal fan to a closed radial sector of another internal fan along a single axis parallel to the central axis.

8. An electrical machine as claimed in claim 7, wherein:
a total number of open and closed radial sectors of an internal fan is 2n, and the two internal fans are mounted with an angular offset on shaft by an angle which is equal to 360/(2n); and n is an even integer ranging between 2 and 12.

9. An electrical machine as claimed in claim 8, wherein the machine is a variable synchronous reluctance machine.

10. An electrical machine as claimed in claim 7, wherein the machine is a variable synchronous reluctance machine.

11. An electrical machine as claimed in claim 1, wherein the internal fans and fins on an inner face of the flanges direct air in radially towards winding heads of the stator, then return air flow from the winding heads to the center of the flanges, first along a direction parallel to the central axis at the winding heads, then radially towards the shaft, to form the second air flow created between each internal fan and the inner face of the front or the rear flange.

12. An electrical machine as claimed in claim 1, wherein the fins of the inner face of the flanges are plane and have a trapezoidal shape comprising bases which are orthogonal to the central axis and a side opposite to the housing is concave.

13. An electrical machine as claimed in claim 1, comprising external cooling for cooling the enclosure and the front flange and the rear flange.

14. An electrical machine as claimed in claim 13, wherein the external cooling comprises an external fan disposed opposite the outer face of the rear flange which is mounted on the rotating shaft to direct outside air along the enclosure in a direction toward the front flange.

15. An electrical machine as claimed in claim 14, wherein the
the enclosure includes an outer surface comprising elongated cooling fins extending along an axis parallel to the central axis of rotating shaft; and
the rear flange comprises a central part formed as a crown which is connected to a cylindrical peripheral part and at least one opening is provided between the central part and the peripheral part of the rear flange for directing the outside air which is directed by external fan into passages formed by the cooling fins of the outer surface of the enclosure.

16. An electrical machine as claimed in claim 15, wherein the external fan comprises a wheel for directing outside air which is fastened to the shaft and a protective plate comprising orifices allowing the directed outside air to enter the plate which is attached to a peripheral part of the rear flange.

17. An electrical machine as claimed in claim 13, wherein the external cooling comprises a coolant circuit including a coolant inlet, a coolant outlet and coolant lines in contact with the enclosure, wherein the coolant circulates to cool the enclosure and the front and the rear flanges, and wherein the lines are integrated in the enclosure.

18. An electrical machine as claimed in claim 1, wherein the coolant comprises water.

* * * * *